US010782935B2

(12) United States Patent
Dempsey

(10) Patent No.: US 10,782,935 B2
(45) Date of Patent: Sep. 22, 2020

(54) METHOD AND SYSTEM TO PROVIDE A GENERALIZED FRAMEWORK FOR DYNAMIC CREATION OF MODULE ANALYTIC APPLICATIONS

(71) Applicant: BOOZ ALLEN HAMILTON INC., McLean, VA (US)

(72) Inventor: James Dempsey, Washington, DC (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 51 days.

(21) Appl. No.: 15/892,940

(22) Filed: Feb. 9, 2018

(65) Prior Publication Data
US 2019/0171425 A1   Jun. 6, 2019

Related U.S. Application Data

(60) Provisional application No. 62/594,265, filed on Dec. 4, 2017.

(51) Int. Cl.
*G06F 8/30* (2018.01)
*G06F 8/36* (2018.01)

(52) U.S. Cl.
CPC . *G06F 8/30* (2013.01); *G06F 8/36* (2013.01)

(58) Field of Classification Search
CPC ..... G06F 8/30; G06F 8/34; G06F 8/35; G06F 8/76; G06F 8/433; G06F 8/443; G06F 8/36
USPC .................. 717/104–113, 120; 715/762–763
See application file for complete search history.

(56) References Cited

U.S. PATENT DOCUMENTS

| | | | | | |
|---|---|---|---|---|---|
| 5,845,119 | A | * | 12/1998 | Kozuka | G06F 8/36 717/107 |
| 5,850,548 | A | * | 12/1998 | Williams | G06F 8/34 717/107 |
| 5,883,639 | A | * | 3/1999 | Walton | G06T 1/00 345/473 |
| 5,889,991 | A | * | 3/1999 | Consolatti | G06F 9/451 717/109 |

(Continued)

OTHER PUBLICATIONS

Ferg, S., "Yet Another Lambda Tutorial", Python Conquers the Universe [online], 2011 [retrieved Jan. 6, 2020], Retrieved from Internet: <URL: https://pythonconquerstheuniverse.wordpress.com/2011/08/29/lambda_tutorial/>, pp. 1-16.*

*Primary Examiner* — Todd Aguilera
(74) *Attorney, Agent, or Firm* — Buchanan Ingersoll & Rooney PC

(57) ABSTRACT

A method and apparatus for generating an application flow logic are disclosed which include performing an initialization process based on storage of at least one software toolbox in a toolbox list of a computer memory device; parsing an application description into a series of module descriptors; creating a module primitive defined in a dictionary as a data string representing a name of a tool in the software toolbox, and a data string for least one of: an input, an output, or a data string; producing a module for each module primitive, an input to each tool being produced as an output of another tool; assembling an application flow logic as a combination of produced modules; and providing access to the application flow logic for execution as a combination of calls to the produced modules stored in the computer memory device.

12 Claims, 15 Drawing Sheets

(56) References Cited

U.S. PATENT DOCUMENTS

| | | | | |
|---|---|---|---|---|
| 7,949,995 B2 * | 5/2011 | Sadlek | ................. | G06F 8/34 |
| | | | | 700/17 |
| 2007/0061778 A1 * | 3/2007 | Sadlek | ................. | G06F 8/34 |
| | | | | 717/113 |
| 2014/0282371 A1 * | 9/2014 | Hirsch | ................. | G06F 8/36 |
| | | | | 717/106 |

* cited by examiner

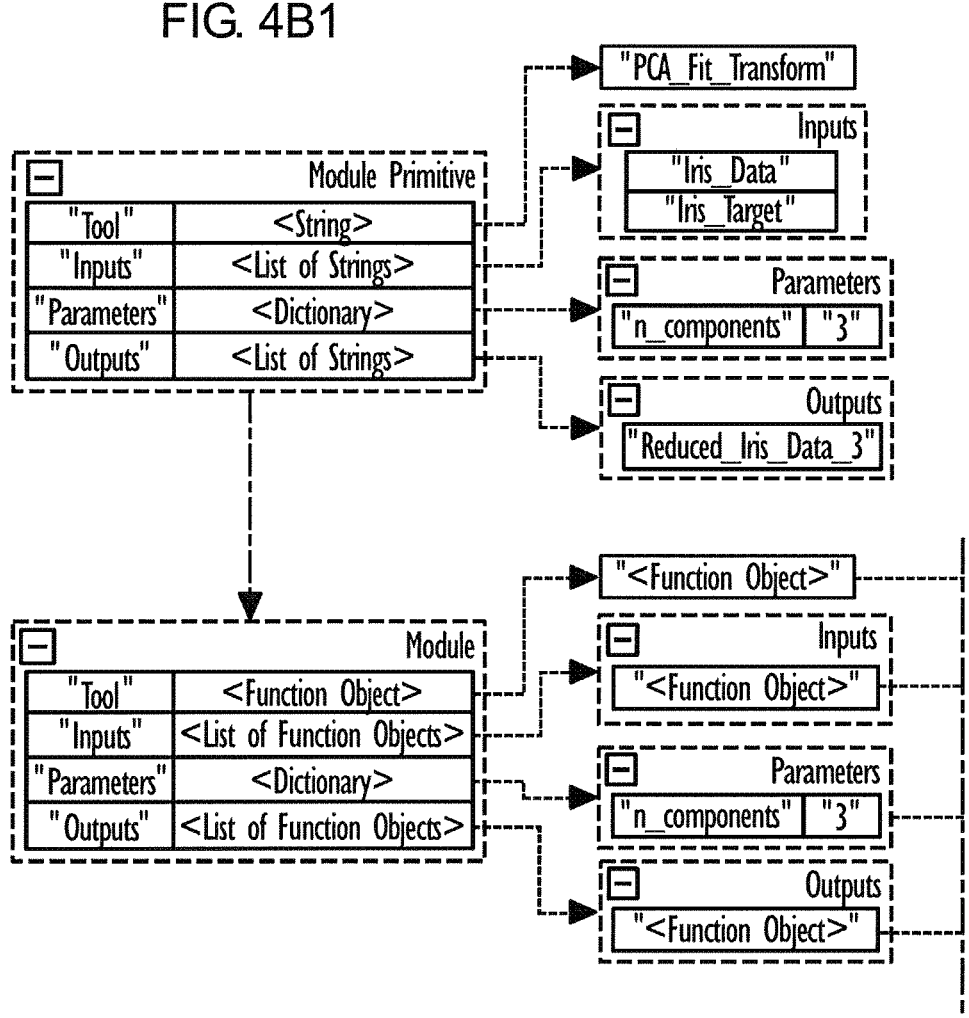
FIG. 4B1

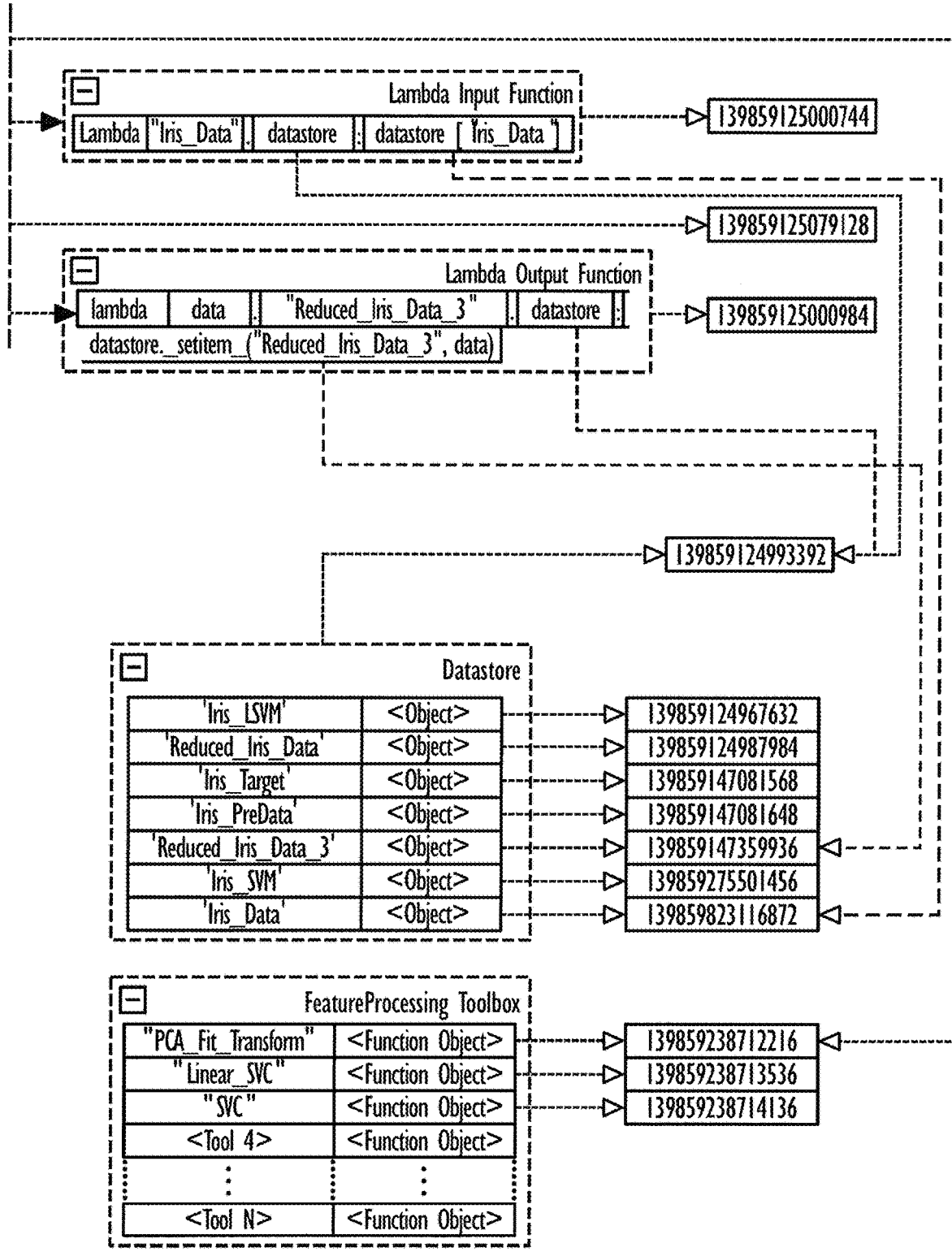
FIG. 4B2

METHOD AND SYSTEM TO PROVIDE A GENERALIZED FRAMEWORK FOR DYNAMIC CREATION OF MODULE ANALYTIC APPLICATIONS

RELATED APPLICATION

This application claims priority under 35 U.S.C. § 119 to U.S. Provisional Application No. 62/594,265 filed Dec. 4, 2017, the entire content of which is hereby incorporated by reference in its entirety.

FIELD

The present disclosure is directed to a method and system for generating an application flow logic.

BACKGROUND INFORMATION

In developing and coding software associated with an application flow logic, software engineers often write modules for use in a specific software application. The modules represent functions to be performed and are developed to include data dependencies on other modules so as to facilitate the flow of data within the application. The modules, as a consequence of these dependencies, are therefore restricted to the specific program or to a limited set of programs that involve the same collection of modules and data flows.

For example, in object-oriented programming, modules encapsulate functionality so as to facilitate program execution efficiency. A software engineer designs classes of modules as software tools for specific applications, to use specific variables and to expect specific data flows. Such designs ultimately limit the use of such modules to the specific use case and class (e.g., to a manager class, employee class, directory class) for which they were created. As a consequence, it can be difficult to reuse modules in a different application once they have been developed in this manner.

For example, when modules are designed around a specific application functionality, this common functionality can introduce dependencies between the variables and data flows of different, otherwise unrelated modules. This compelled interrelationship between modules makes it difficult to use any given module in a new application context, because the module has been designed to operate under the expectation or requirement that certain variables or data flows exist, which may not be true in the new application (for instance, requiring specific data as an argument to pass unaltered to another following module, or the expectation that another module will have modified some variable in some way prior to the module being called). Built-in dependencies of this manner, which are common in object-oriented programming, ultimately limit the portability of the software code used to represent the module.

Accordingly, it would be desirable to develop a module structure for a software tool, and to develop a software tool/datastore interface, which together would allow for individual software tools to retrieve data from and deposit data to a shared datastore. Such an implementation would separate the flow of data from the application flow logic, allowing modules to be designed independently from the applications they are used it.

It is also the case that, even if intermodular dependencies are completely avoided in developing software modules, it is still necessary to write additional software to provide the application flow logic to implement a specific application.

The software tools should be fully portable for use in designing, developing and executing new software application flow logics, that can be executed with a high level of efficiency. Such software application flow logics should be developed by creating software tools that have an input produced as the output of another software tool without requiring data dependencies within the tools' architectures.

SUMMARY

A method is disclosed for generating an application flow logic, the method comprising: performing an initialization process based on storage of at least one software toolbox in a toolbox list of a computer memory device, the software toolbox having tools for performing software functions, and based on receipt of at least one application file by a computer; parsing the application file into a series of module descriptors; creating, for each parsed module descriptor, a module primitive defined in a dictionary as a data string representing a name of a tool in the software toolbox, and a data string for least one of: an input, an output, or a data string to describe at least one parameter; producing a module for each module primitive by accessing an existing tool stored in the computer memory device and by creating at least one list of input and/or output functions for combination with the existing tool, an input to each tool being produced as an output of another tool; assembling an application flow logic as a combination of produced modules; and providing access to the application flow logic for execution as a combination of calls to the produced modules stored in the computer memory device.

A system is also disclosed for generating an application flow logic, the system comprising: a computer and an associated datastore configured for: performing an initialization process based on storage of at least one software toolbox in a toolbox list of a computer memory device, the software toolbox having tools for performing software functions, or based on receipt of at least one application file by a computer; parsing the application file into a series of module descriptors; creating, for each parsed module descriptor, a module primitive defined in a dictionary as a data string representing a name of a tool in the software toolbox, and a data string for least one of: an input, an output, and a data string to describe at least one parameter; producing a module for each module primitive by accessing an existing tool stored in the computer memory device and by creating at least one list of input and/or output functions for combination with the existing tool, and input to each tool being produced as an output of another tool; assembling an application flow logic as a combination of produced modules; and providing access to the application flow logic for execution as a combination of calls to the produced modules stored in the computer memory device.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein:

FIGS. 4A-4G illustrate further details of the exemplary FIGS. 1A and 1B method and execution of an assembled program.

DETAILED DESCRIPTION

The present disclosure is directed to a method and system for providing a generalized framework for dynamic creation of module analytic applications. Exemplary embodiments as described herein provide a module structure for a software tool, and provide a software tool/datastore interface, which together allow for efficient application flow logic design and efficient end program execution, using for example, an input/output (I/O) wrapper function that is applied as "decorator" to abstract away intermodular dependencies from the modulas and thereby render a software tool/datastore interface transparent to a software tool, as disclosed herein. The software tools are fully portable for use in designing, developing and executing other new software applications that can be similarly executed with a high level of efficiency. Such software applications can be implemented by creating and accessing software tools that each have an input(s) which are only produced as the output(s) of another software tool (i.e., without requiring data dependencies within the tools' architectures).

Figure 1A:
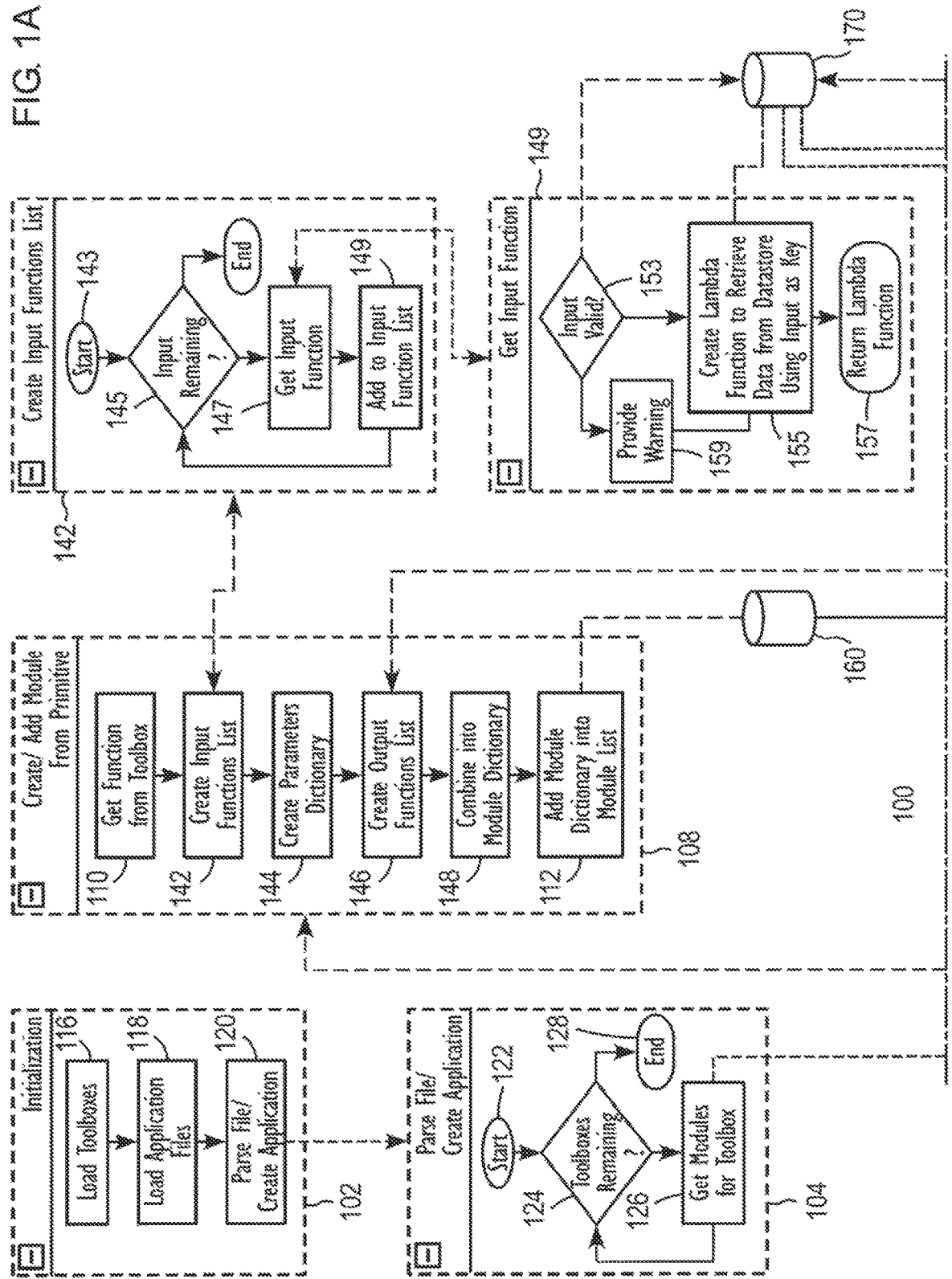
FIGS. 1A and 1B are exemplary methods in accordance with the present disclosure.
Figure 1B:
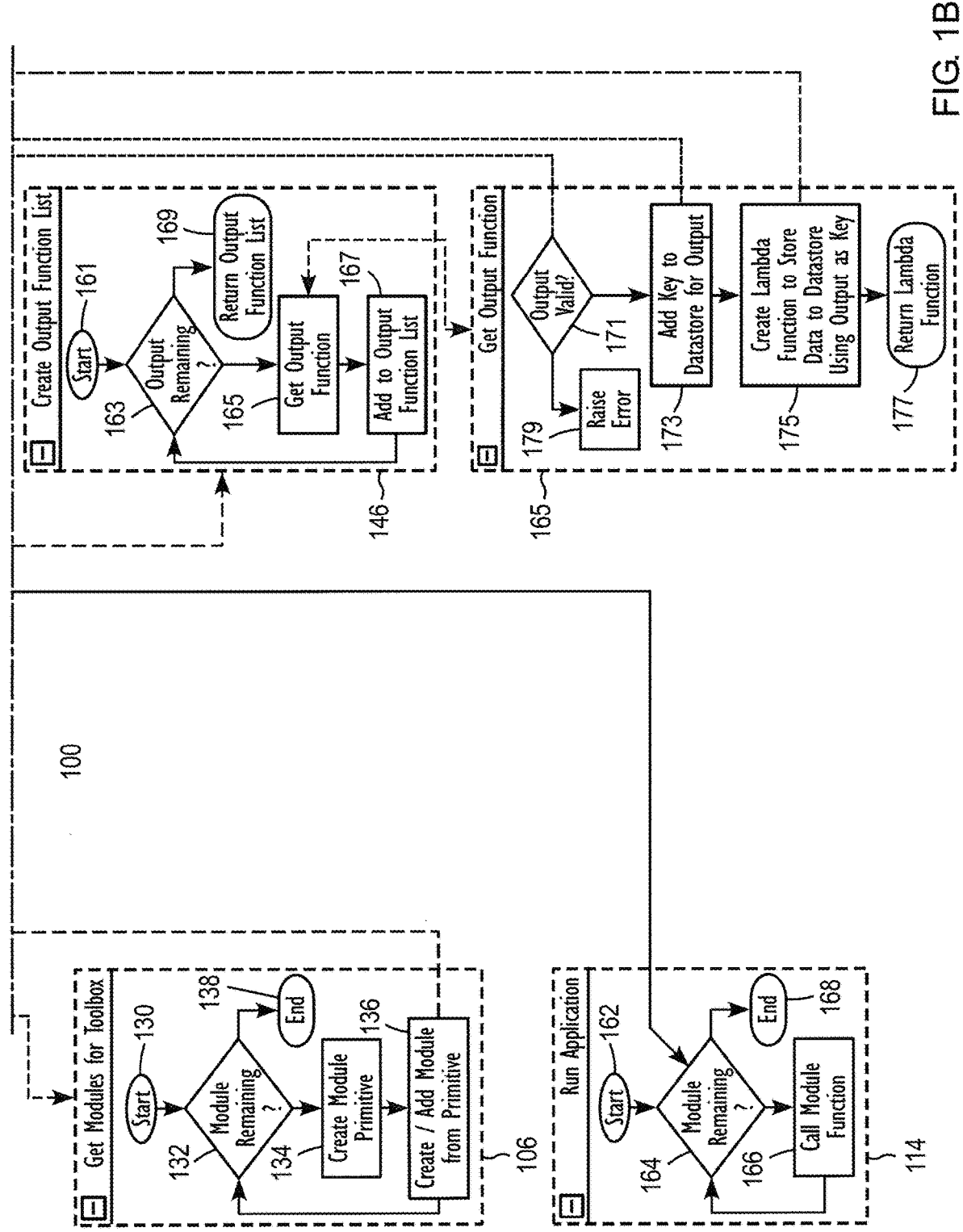

FIGS. 1A and 1B illustrate an exemplary method (100) for generating an application flow logic in a manner as disclosed herein. An application flow logic in accordance with exemplary embodiments is configured to include a tool with produces output data which is then deposited into a shared datastore structure using an output function. Another tool can then use an input function to retrieve that data from the shared datastore. Such a configuration of tools in conjunction with a shared datastore avoids a an intermodular dependency (e.g., avoids an intermodular data dependency) when interconnecting tools, and instead causes tool input/outputs to occur via intermediary input and output functions which wrap around calls to and from the shared datastore. Exemplary embodiments eliminate the utilization of tools as both tools and as data transportation media. A tool can actively use all the data it is supplied, and does not simply pass variables around because of a legacy application flow. As referenced herein, "intermodular dependency" includes not only data transportation dependencies, but also global state dependencies and execution order dependencies. The data flow and application flow are separated, but in order to facilitate that separation, a set of standards is provided whereby the tools use certain functions to retrieve date and other functions to deposit it, via the 10 wrapper which handles the framework standards for each function wrapped by it and abstraction of the 10 wrapper (lambda) functions.

Exemplary methods and systems as disclosed can implement a software application's flow logic automatically and independently from the functional modules (i.e., tools) which collectively form the software application. A software engineer implementing features of the present disclosure using a tool architecture described herein with a novel datastore interface can write reusable modules as tools which can be accessed for further software applications, yet preserve efficiency of operation during the execution of those software applications. The provision of a portfolio of reusable modules in the automatic generation of application flow logic allows for creation of executable software applications by simply specifying which modules to use and in what order to use them (e.g., which inputs and outputs to call, identification of passed parameters, and so forth).

The exemplary methods of FIGS. 1A and 1B (100) include performing an initialization process (102) based on storage of at least one software toolbox in a toolbox list of a computer memory device, the software toolbox having tools for performing software functions, and based on receipt of at least one application file by a computer. The initialization process 102 includes loading toolboxes (116) as a toolbox name string and finding relevant tools in a directory of tools contained within a shared datastore (170) for importation into a toolbox list wherein the tools will be accessible for purposes of application flow logic creation. The method can use an application file to provide the application description. A file is a common and convenient means to provide a string, but it is not obligatory. If a GUI were used to construct an application flow logic as an assemblage of block icons, for example, there would be no need for a file, since the application description could be generated directly from the GUI.

The initiation process 102 also includes the loading of an application file (118). For example, an application file can be a user specified list of files, inputs and outputs in an XML format, or any suitable file format. The initialization process (102) then proceeds to a parsing of the application file for purposes of creating an application flow.

The parsing (120) is represented in FIG. 1A as an initial parsing (104) of the application file into a series of module descriptors. This parsing begins with a start block (122) and continues via a decision block (124) to a get modules for the toolbox (126). When all toolboxes have been accessed, the parsing is completed as represented by an end block (128).

The method (100) includes creating (106), for each parsed module descriptor, a module primitive defined in a dictionary as a data string representing a name of a tool in the software toolbox, and a data string for least one of: an input, an output, or a data string to describe at least one parameter. This step of creating begins with a start block (130), and for each module proceeds via a decision block (132) to create a module primitive (134) that can be used to create/add a module based on the module primitive (136). The process is performed for each module, and concludes with an end block (138).

The method (100) includes producing (108) a module for each module primitive by accessing (110) an existing tool stored in the datastore (170) of a computer memory device and by creating at least one list of input and/or output functions for combination with the existing tool, an input to each tool being produced as an output of another tool. This is illustrated in FIG. 1A with a get function from toolbox (110), followed by creating an input functions list (142), creating a parameters dictionary (144), creating an output functions list (146), and combining these in a module dictionary data structure (148). The module dictionary is added to a modules list (112) to assemble the modules into an application flow logic.

The method (100) includes assembling (112) an application flow logic as a combination of produced modules (160). That is, the module dictionary is added to a modules list (112) to assemble the modules into an application flow logic.

The method (100) includes providing (114) access to the application flow logic for execution as a combination of calls to the produced modules stored in the computer memory device. This is illustrated in FIG. 1B as a run application block which begins as a start block (162) and proceeds via a decision block (164) to call each module function in a designated order (166) until an end block (168) when all produced modules have been called and executed.

The creating an input functions list (142) includes, from a start block (143), processing via a decision block for each input function (145) to get each input function (147) for adding to the input functions list (149) and then returning the input functions list (151). A get input function (149) involves determining whether the input is valid (153) and creating a lambda function to retrieve data from the datastore (170) using the input function as a key (155), and then returning the lambda function (157). For an invalid input, a warning can be provided (159).

The creating of an output functions list (146) can include proceeding from a start block (161) for each remaining output via a decision block (163) to a get output function (165), and then adding the output function to an output function list (167). The output function list is returned (169) when all output functions have been acquired.

A get output function 165 can include, for each valid output (171) adding of a key to the datastore (170) for output (173), creating a lambda function to store data to the datastore using the output as a key (175) and then returning the lambda function (177). For an invalid output function, an error can be returned (179).

Those skilled in the art will appreciate that a lambda function as referenced herein can be an anonymous function that is defined without a name (e.g., as in Python). Such anonymous functions can be defined using a lambda keyword.

In accordance with exemplary embodiments, lambda functions can be used to wrap input and output keys with requests to the datastore (170). The datastore (170) stores the outputs from all tools in a single common dictionary in exemplary embodiments. The output names provided via, for example, the XML application file, are used as key values when storing data in the datastore. The same key values can be used to retrieve data from the datastore. According to exemplary embodiments, an input for a tool is required to be an output from some other tool. Any input which cannot be specified as such (e.g., a filename) must be supplied as a parameter.

The lambda functions as already described can act as get and set call back functions for the datastore, and act to abstract the datastore from the tools. This avoids having to store key values, and avoids the passing of parameters directly between modules (i.e., tools). Each input listed for a tool in the XML application file is wrapped by a lambda function which is added as a list of inputs of the tool. This can also be performed for the tool outputs. The tool, the tool's name, the input list, the output list and any parameters dictionary data structure, are combined into a dictionary data structure referenced herein as a tool that can be instantiated in a new application as a module for performing a particular software function. One assembled, the module is added to the modules list.

Each tool is wrapped inside of a function which provides management of the inputs and outputs for that function. As mentioned, this wrapper is applied using a "decorator" design pattern, and represents an object-oriented programming approach, where I/O operations for functions are considered as a cross-cutting concern. An instance of the I/O wrapper is effectively called when a module is called; it accepts as an input a module dictionary. The I/O wrapper calls each input lambda function to retrieve inputs from the datastore, and passes them to the tool, along with any expanded parameters dictionary. It then uses the output lambda functions listed in the module's dictionary to store the results output by the tool.

The I/O wrapper function is thus used to modify tools in one or more toolboxes so that the software tool/database interface is transparent to the software tool.

An "IO_wrapper( ) function" is therefore applied within the code as a decorator, and not during runtime; it is a valuable part of the disclosed exemplary method because it allows tools to be created without making any special considerations for the disclosed exemplary method. For example, it allows intermodular dependencies to be abstracted away from the modules. The IO_wrapper( ) code can be considered part of a tool. Again the IO_wrapper is not applied at runtime, but can make the framework of the disclosed exemplary method extremely flexible.

The IO_wrapper( ) function can be applied to tools within their source code or can be applied dynamically to completely remove any references to related functionality from the tools that it implements. The IO wrapper can therefore allow for other dynamically applied metafunctions. Without the I/O wrapper, "isolation" of the software tools as disclosed herein can only be guaranteed by the quality of the programmer.

By using a system as disclosed herein, tools as disclosed can be abstracted and do not have to be written to adhere to an special signature, or be aware of how data is maintained outside of their scope. They do not have to use special functions to request input data (as this is performed for them by the I/O wrapper), nor do they have to use special functions to store the results (as this is also performed for them by the I/O wrapper). Such functions make it impossible for tools to communicate with each other, which makes global applicability of an application limited in variability only by those tools which have completed processing into data structures as disclosed herein, with access via the disclosed lambda functions to the datastore.

Once a user is satisfied with an application's functionality, exemplary embodiments can be used to generate an external, standalone application which provides equivalent functionality. To do this, exemplary embodiments retrieve the source code of each tool (and associated file-local functions) and write it to an external file. It provides wrappers around each tool and the control logic to emulate the desired functionality as well. The generated application can be run without using features disclosed herein and without access to the described toolboxes.

Additional features can be implemented in accordance with exemplary embodiments, For example, the parsing can include parsing multiple input application files in multiple formats to create the application flow logic.

The parsing can for example include reading the application file to obtain data strings for constructing the module primitive.

The creating of a module primitive data structure can include creating a module primitive for each of plural parsed modules, wherein each module primitive is defined by a data string representing a name of a tool within the software toolbox, at least one of an input or an output, and/or at least one parameter.

The producing of a module data structure can include accessing a tool in the software toolbox as a memory location of a function, and creating functions stored in the datastore of the computer memory device which are accessible by values that correspond to the input and/or output data strings of the function.

The assembling of an application flow logic can include collecting the modules together into a computer executable structure, wherein positions of the modules in the structure denote an order of execution.

That is, the method of FIGS. 1A and 1B can include executing each module in an order of execution whereby the executing includes input functions for the module to retrieve data from the datastore of the computer memory device, the data being passed to the module's tool; and returning values for storage in the datastore of the computer memory device using an output function for that module.

Thus, once all of the modules have been created, a user can run the application. In accordance with exemplary embodiments, modules are first called by toolbox, and then in the order in which they appear in the application (e.g., XML) file. Each tool is passed a copy of the module as an input argument.

Figure 2:
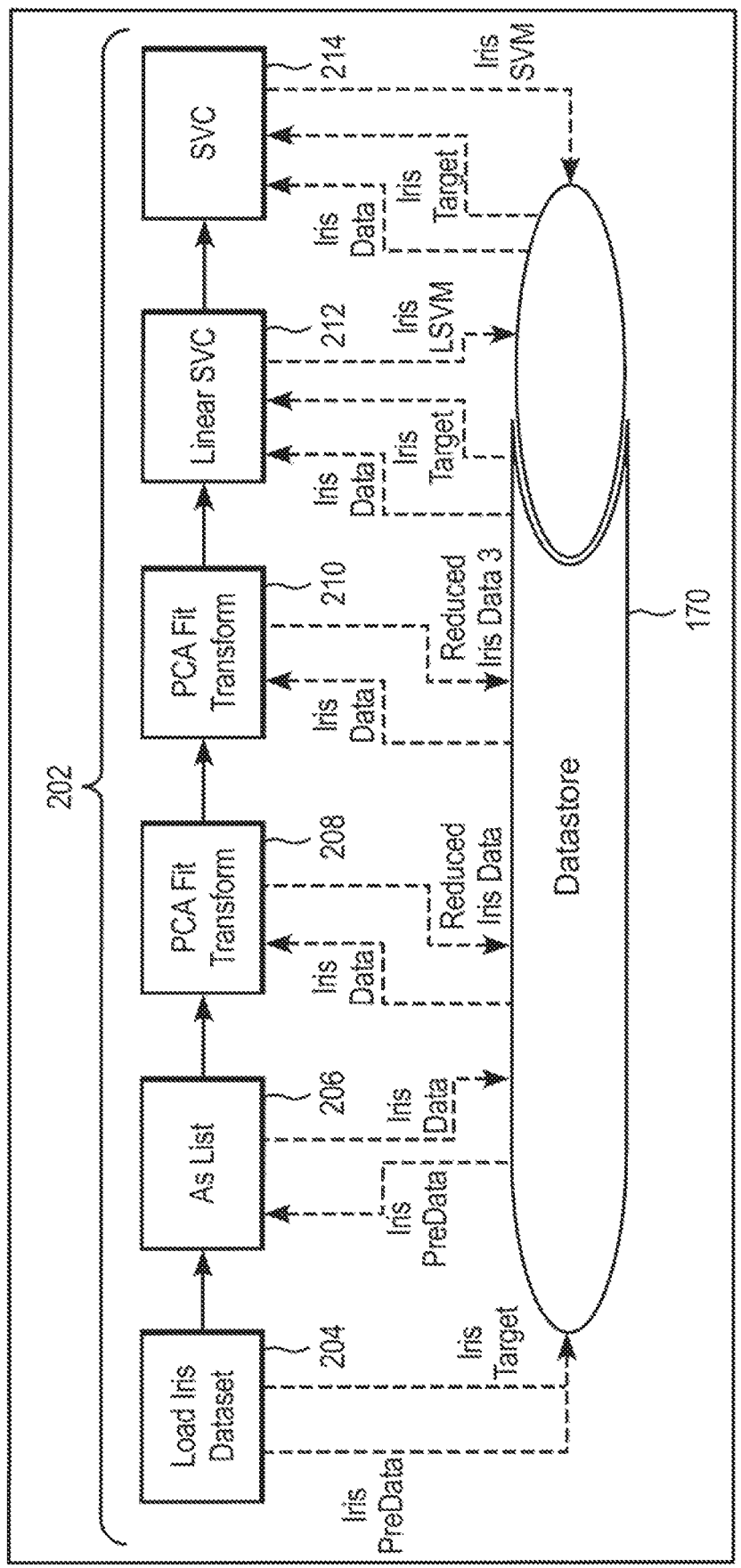
FIG. 2 is an exemplary system running an application assembled in accordance with the present disclosure.

FIG. 2 illustrates a system (202) for generating an application flow logic for a given set of modules. The system (202) includes a computer (202) which can be programmed to perform the functions as disclosed herein.

The computer system may be implemented using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 1A and 1B.

If programmable logic is used, such logic may execute on a commercially available processing platform or a special purpose device. A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the described embodiments. A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit, a removable storage unit, and a hard disk installed in hard disk drive.

Various embodiments of the present disclosure are described in terms of this exemplary computer system. After reading this description, it will become apparent to those skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor devices used may be a special purpose or a general purpose processor device. The processor device may be connected to a communications infrastructure such as a bus, message queue, network, multi-core message-passing scheme, etc. The network may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The computer system may also include a main memory (e.g., random access memory, read-only memory, etc.), and may also include a secondary memory. The secondary memory may include the hard disk drive and a removable storage drive, such as a floppy disk drive, a magnetic tape drive, an optical disk drive, a flash memory, etc.

The removable storage drive may read from and/or write to the removable storage unit in any well-known manner. The removable storage unit may include a removable storage media that may be read by and written to by the removable storage drive. For example, if the removable storage drive is a floppy disk drive or universal serial bus port, the removable storage unit may be a floppy disk or portable flash drive, respectively. In one embodiment, the removable storage unit may be non-transitory computer readable recording media.

In some embodiments, the secondary memory may include alternative means for allowing computer programs or other instructions to be loaded into the computer system, for example, the removable storage unit and an interface. Examples of such means may include a program cartridge and cartridge interface (e.g., as found in video game systems), a removable memory chip (e.g., EEPROM, PROM, etc.) and associated socket, and other removable storage units and interfaces as will be apparent to those having skill in the relevant art.

Data stored in the computer system (e.g., in the main memory and/or the secondary memory) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to those skilled in the relevant art.

An associated datastore (170) is configured for use in performing the FIG. 1A method with its features of performing an initialization process (102) based on storage of at least one software toolbox in a toolbox list of a computer memory device, the software toolbox having tools for performing software functions, or based on receipt of at least one application file by a computer; parsing (104) the application file into a series of module descriptors; creating (106), for each parsed module descriptor, a module primitive defined in a dictionary as a data string representing a name of a tool in the software toolbox, and a data string for least one of: an input, an output, or a data string to describe at least one parameter; producing (108) a module for each module primitive by accessing (110) an existing tool stored in the computer memory device and by creating at least one list of input and/or output functions for combination with the existing tool, and input to each tool being produced as an output of another tool; assembling (112) an application flow logic as a combination of produced modules; and providing (114) access to the application flow logic for execution as a combination of calls to the produced modules stored in the computer memory device.

The FIG. 2 system as illustrated represents the creation and running of an application having six modules as instantiated tools (204)-(214) which interface with the datastore (170). In developing an application flow logic, four basic or generalized functions are often identified: 1) data acquisition; (2) feature extraction; (3) feature processing; and (4) results. In the FIG. 2 example, solid arrows illustrate a logical application flow, and dashed arrows show data flow. Note that in accordance with exemplary embodiments, dart does not flow from one tool, or module, to the next, but rather all data flows into and out of the shared datastore (170).

In FIG. 2, for an exemplary standalone application, a data acquisition function is associated with loading an iris data set via tool (204). The FIG. 2 example, does not include a feature extraction tool function, but does include several feature processing tool functions designated as: As List (206); Principal Component Analysis (PCA) Fit Transform (208); PCA Fit Transform (210); Linear Support Vector Classification (SVC) (212); and SVC (214). The As List tool (206) has an input name "Iris Pre Data" and an output name "Iris Data". The PCA Fit Transform tool (208) has an input name "Iris Data" and an output name "Reduced Iris Data". The PCA Fit Transform (210) has an input name "Iris Data", a parameter name "n components" and an output name "Reduced Iris Data 3".

The linear SVC tool (212) includes an input name "Iris Data", an input name "Iris Target", a parameter name "C", a parameter name "Mesh Size" and an output name "Iris LSVM" (Linear Support Vector Machine). The SVC tool (214) includes an input name "Iris Data", an input name "Iris Target", a parameter name "C", a parameter name "Gamma", a parameter name "Mesh Size" and an output name "Iris SVM".

In the exemplary FIG. 2 embodiment, the application does not include a results tool. However, if the application involves, for example, storage or display of data, a results tool could be included.

FIGS. 3A-3E illustrate exemplary data structures which can be used in accordance with exemplary embodiments as already described herein to allow for the creation and execution of an application flow logic.

Figure 3A:
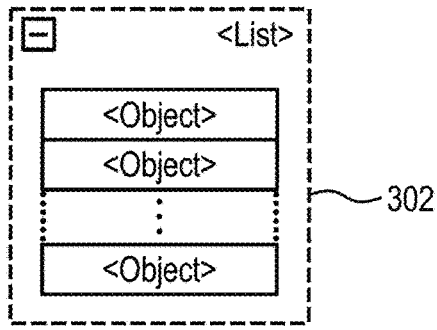
FIGS. 3A-3E illustrate exemplary data structures for producing modules used in the embodiments of FIGS. 1 and 2.

FIG. 3A shows a data structure for a list (302) as a contiguous collection of numerically-accessible objects.

Figure 3B:
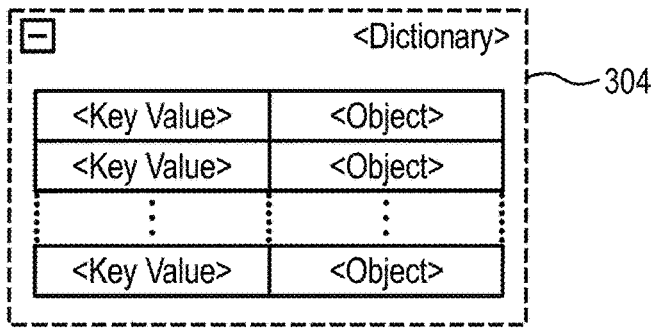

FIG. 3B illustrates an exemplary data structure for a dictionary (304) as a collection of objects accessible by unique string key values.

Figure 3C:
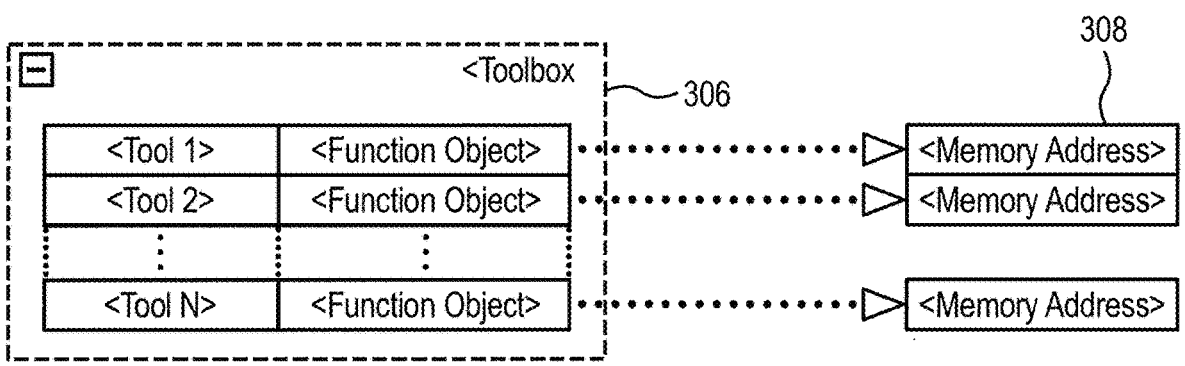

FIG. 3C illustrates an exemplary data structure for a tool box (306) as a dictionary for mapping tool names to function objects representing the tools, with associated memory addresses (308).

Figure 3D:
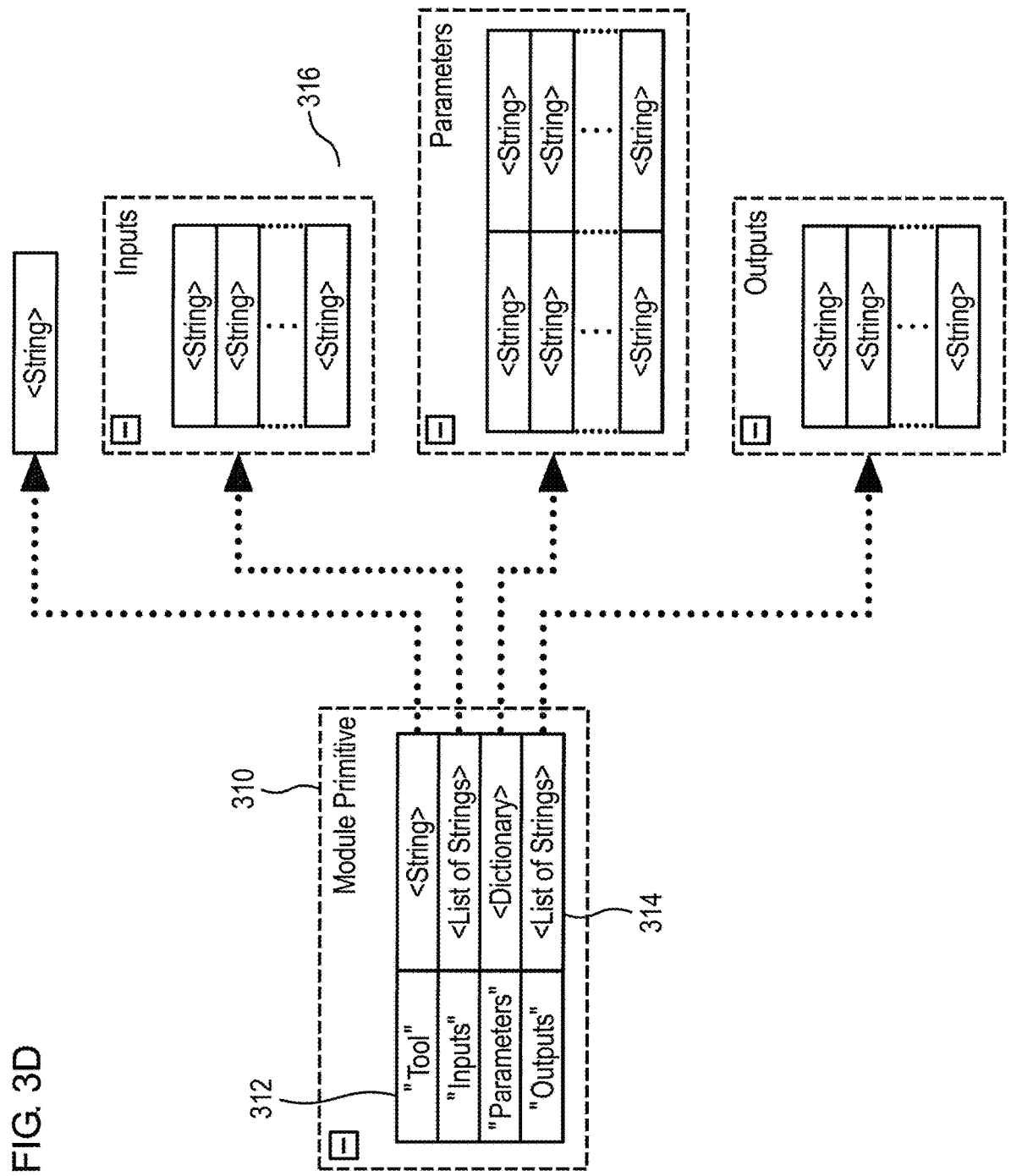

FIG. 3D shows an exemplary data structure for a module primitive (310), represented as a dictionary for mapping default fields (312) to strings (314) or collections (lists) of strings (316), used to construct modules, and containing a dictionary for implementing the module primitive.

Figure 3E:
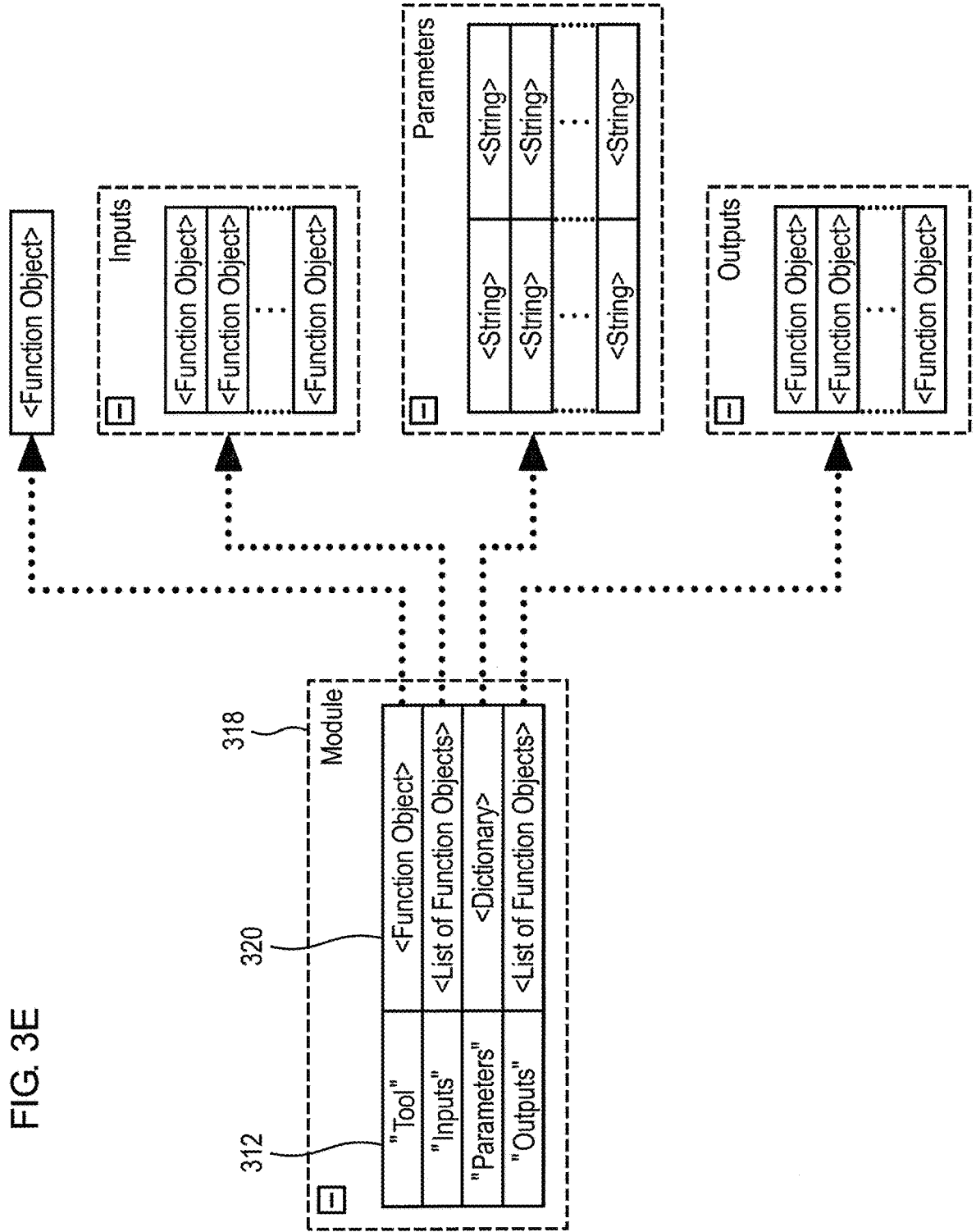

FIG. 3E illustrates an exemplary data structure for a module (318), representing a dictionary containing function objects (320) and containing a dictionary for implementing a tool, the module being created a module primitive (310) and its associated default fields (312).

FIGS. 4A-4F' illustrate in greater detail exemplary implementation of the FIGS. 1A and 1B method.

Figure 4A:
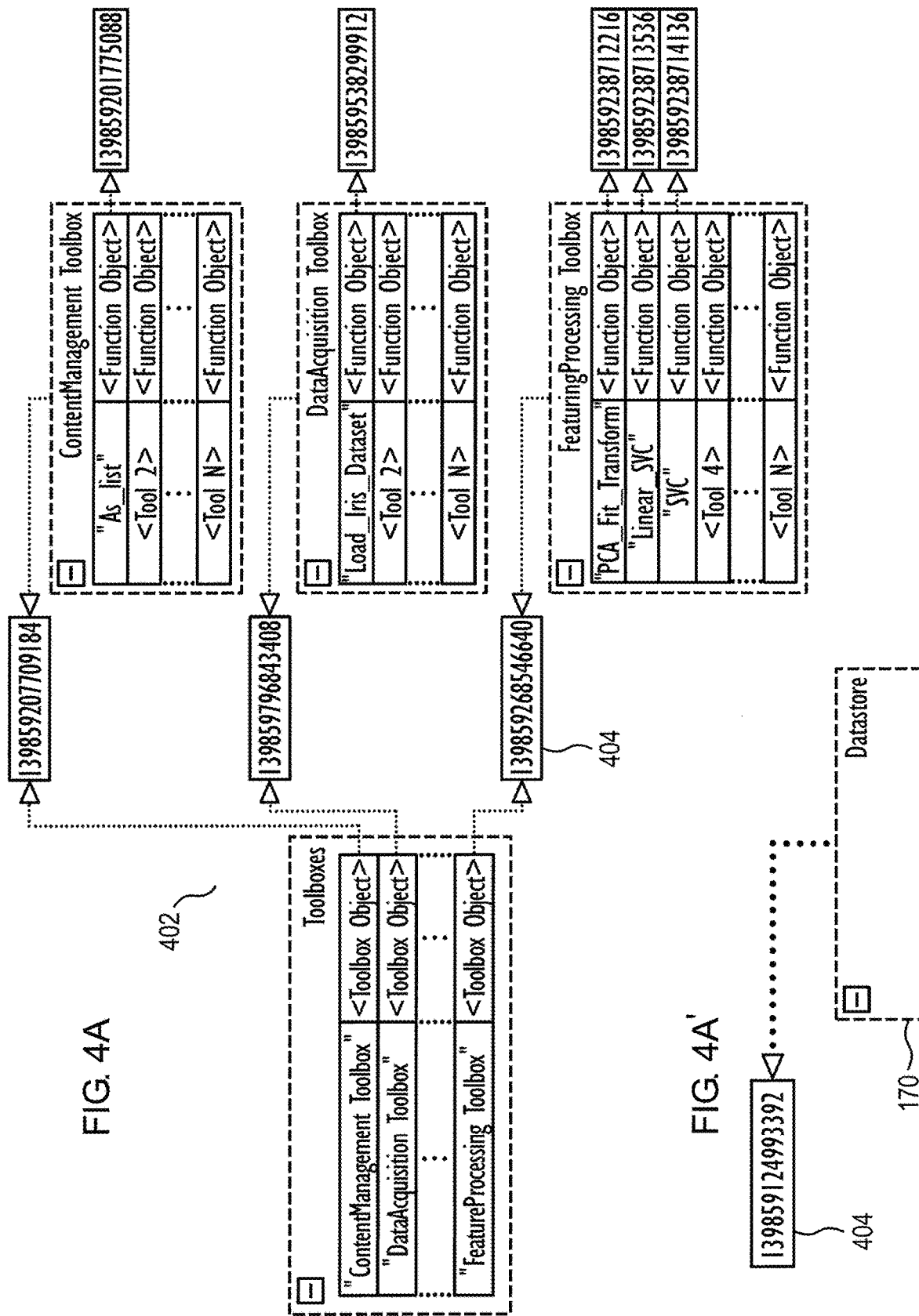

In FIG. 4A, the initialization process (102) is represented as procedure (402) whereby toolboxes are loaded into memory, with only utilized toolboxes being shown. Each toolbox is added to the list of toolboxes.

FIG. 4A' shows the datastore 170, with the datastore being a dictionary data structure which will ultimately contain the outputs from each tool. In FIGS. 4 and 4A', data strings 404 are illustrated as tool outputs.

FIGS. 4B1 and 4B2 illustrate the parsing operation (104) as procedure (406) whereby an input application XML is parsed into a series of module descriptors which are used to create module primitives (106), which collect all of the strings and parameters needed for a module. The module primitives are then converted into a module by retrieving the tool from an appropriate toolbox and wrapping the inputs and outputs into lambda functions. Input lambda functions (e.g., IO wrapper functions). Input lambda functions retrieve an object from the datastore associated with a particular key value when called. Output lambda functions set an object in the datastore associated with a particular key value when called.

Figure 4C:
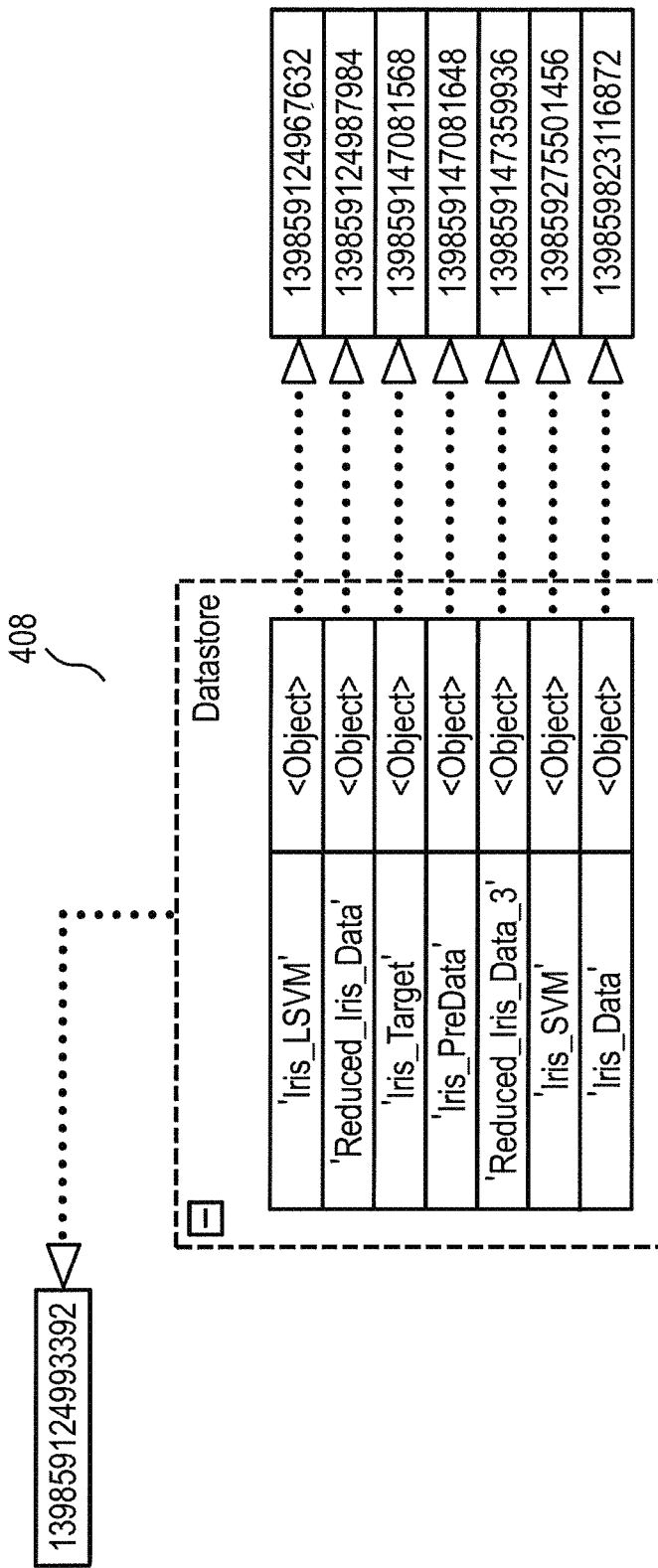

FIG. 4C' shows the producing of a module (108), as represented by a procedure (408), whereby output strings for each module primitive are added as key values to the datastore as each module is recreated.

Figure 4D:
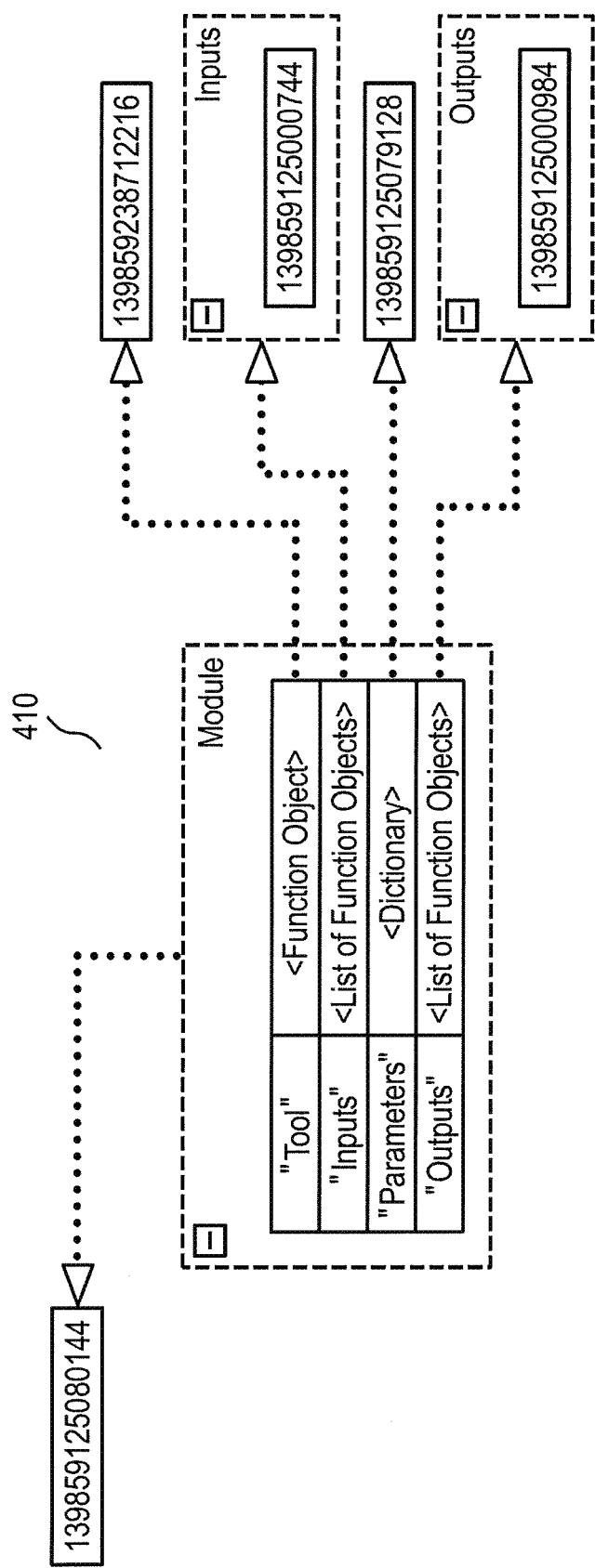

FIG. 4D shows the producing (108) of a finalized module (410) having the form illustrated. The memory locations for each function and for the parameters dictionary are collected into a single module dictionary of the datastore (170).

Figure 4E:
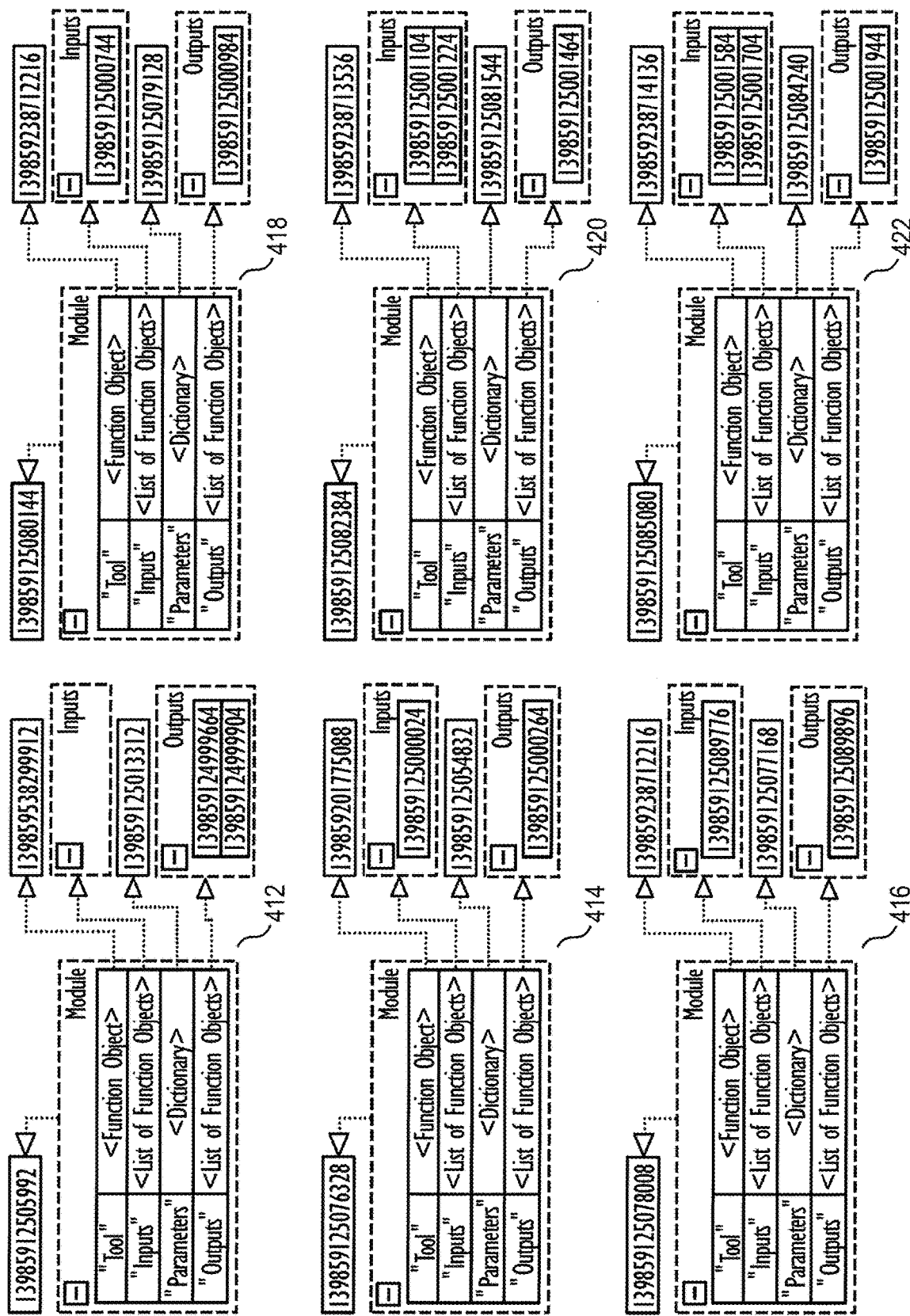
Figure 4E:
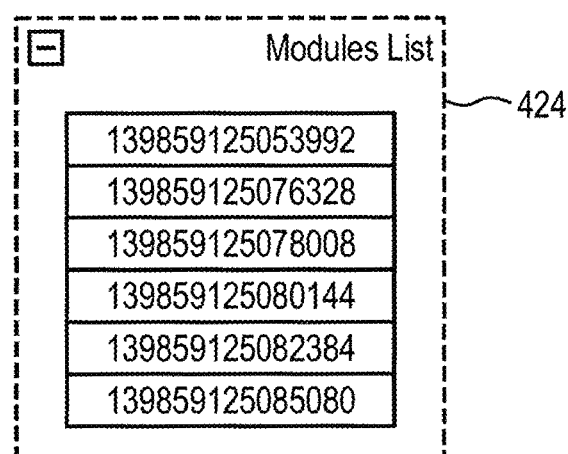

FIG. 4E shows the parsing of an entire XML file will produce the modules (412), (414), (416), (418), (420), and (422).

FIG. 4E' illustrates the assembling (112) as a modules list (424), wherein each module is added to the list in the order it appeared in the application XML. When the user wishes to provide access to the application flow logic (114) for execution, each module is retrieved from the list and input lambda functions are called to retrieve correct data from the datastore (170). Those values are passed to the respective tool, and output lambda functions are used to store values returned by the tool.

Figure 4F:
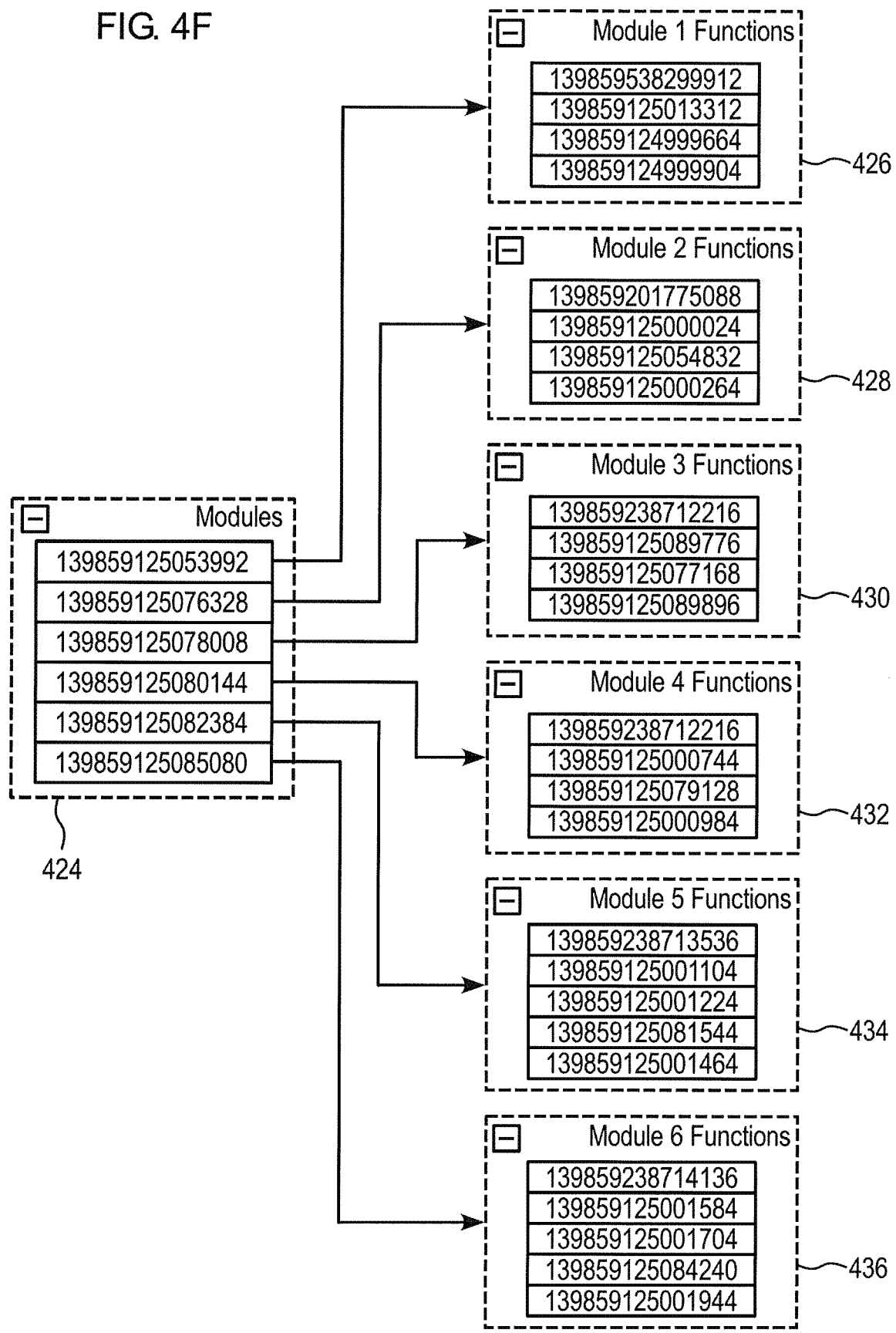

FIG. 4F shows functions called for each module, the functions being labeled (426), (428), (430), (432), (434) and (436).

Figure 4G:
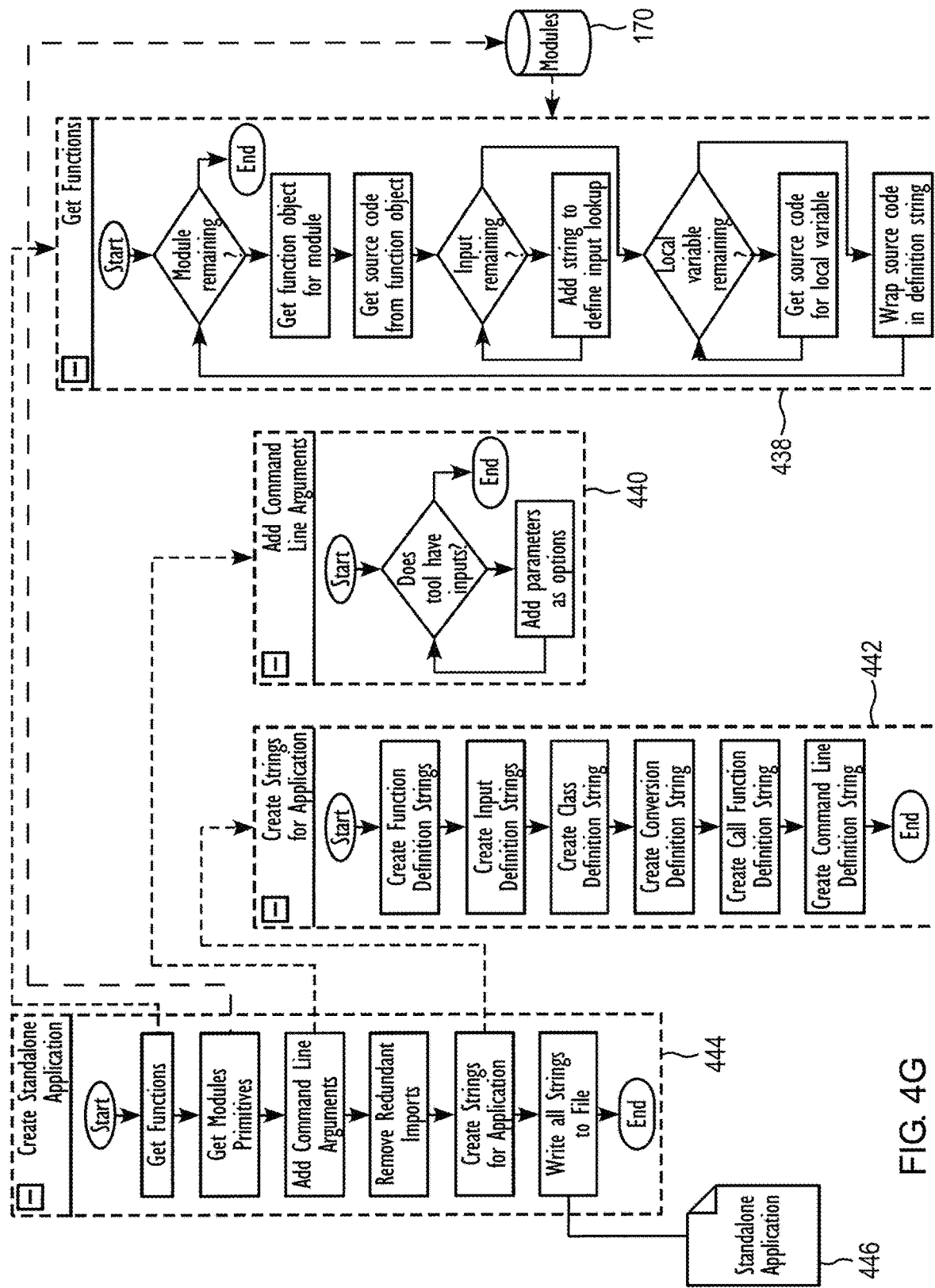

FIG. 4G shows an exemplary overview of the features described herein for getting functions (438), for adding command line arguments (440), for creating strings for applications (442) and using the various input to create (444) a standalone application (446) using modules and data stored with respect to modules in the datastore 170.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for generating an application flow logic, the method comprising:
    performing an initialization process based on storage of at least one software toolbox in a toolbox list of a computer memory device, the at least one software toolbox having tools for performing software functions, and based on receipt of at least one application description by a computer;
    parsing the application description into a series of module descriptors;
    creating, for each parsed module descriptor, a module primitive defined in a dictionary as a data string representing a name of a tool in the at least one software toolbox, and a data string for least one of: an input, an output, or a data string to describe at least one parameter;

producing a module for each module primitive by accessing an existing tool stored in the computer memory device and by creating at least one list of input and/or output functions for combination with the existing tool, and input to each tool being produced as an output of another tool, wherein each input and/or output function comprises a lambda function which wraps an input or output of one or more tools in the at least one software toolbox, wherein each lambda function is associated with a datastore of values for the one or more tools in the at least one software toolbox such that each input lambda function retrieves data from the datastore and each output function deposits data into the datastore;

assembling an application flow logic as a combination of produced modules; and providing access to the application flow logic for execution as a combination of calls to the produced modules stored in the computer memory device.

2. The method of claim 1, wherein the parsing comprises:
parsing multiple application files to create the application flow logic.

3. The method of claim 1, wherein the parsing comprises:
reading an application file to obtain data strings for constructing the module primitive.

4. The method of claim 1, wherein the creating comprises:
creating a module primitive for each of plural parsed modules, wherein each module primitive is defined by a data string representing a name of a tool within the at least one software toolbox, at least one of an input or an output, and at least one parameter.

5. The method of claim 4, wherein the producing comprises:
accessing a tool in the at least one software toolbox as a memory location of a function; and
creating functions stored in the computer memory device, the created functions being accessible by values in the datastore that correspond to input and/or output data strings of a created function.

6. The method of claim 1, wherein the assembling comprises:
collecting the modules together into computer executable structure, wherein positions of the modules in the structure denote an order of execution.

7. The method of claim 1, comprising:
executing each module in an order of execution, whereby the executing includes input functions for a respective module to retrieve data from the computer memory device, the data being passed to an existing tool of the respective module; and
returning values for storage in the datastore of the computer memory device using an output function for the respective module.

8. A system for generating an application flow logic, the system comprising:
a computer and an associated datastore configured for:
performing an initialization process based on storage of at least one software toolbox in a toolbox list of a computer memory device, the at least one software toolbox having tools for performing software functions, or based on receipt of at least one application description by a computer;
parsing the application description into a series of module descriptors;
creating, for each parsed module descriptor, a module primitive defined in a dictionary as a data string representing a name of a tool in the at least one software toolbox, and a data string for least one of: an input, an output, and a data string to describe at least one parameter;
producing a module for each module primitive by accessing an existing tool stored in the computer memory device and by creating at least one list of input and/or output functions for combination with the existing tool, and input to each tool being produced as an output of another tool, wherein each input and/or output function comprises a lambda function which wraps an input or output of one or more tools in the at least one software toolbox, wherein each lambda function is associated with a datastore of values for the one or more tools in the at least one software toolbox such that each input lambda function retrieves data from the datastore and each output function deposits data into the datastore;
assembling an application flow logic as a combination of produced modules; and
providing access to the application flow logic for execution as a combination of calls to the produced modules stored in the computer memory device.

9. A system of claim 8, wherein the parsing comprises:
reading an application file to obtain data strings for constructing the module primitive.

10. A system of claim 8, wherein the parsing comprises:
creating a module primitive for each of plural parsed modules, wherein each module primitive is defined by a data string representing a name of a tool within the at least one software toolbox, at least one of an input or an output, and at least one parameter.

11. A system of claim 8, wherein the parsing comprises:
accessing a tool in the at least one software toolbox as a memory location of a function; and
creating functions stored in the computer memory device which are accessible by values in the datastore that correspond to input and/or output data strings of a created function.

12. A system of claim 8, wherein the parsing comprises:
collecting the modules together into computer executable structure, wherein positions of the modules in the structure denote an order of execution.

* * * * *